US010758077B1

(12) United States Patent
Wilkie et al.

(10) Patent No.: US 10,758,077 B1
(45) Date of Patent: Sep. 1, 2020

(54) FULVIC ACID-HUMIC ACID COFFEE BREWER METHOD AND DEVICES

(71) Applicants: Louise Wilkie, Surrey, CA (US); Jacqueline Wilkie, Surrey, CA (US)

(72) Inventors: Louise Wilkie, Surrey, CA (US); Jacqueline Wilkie, Surrey, CA (US)

(*) Notice: Subject to any disclaimer, the term of this patent is extended or adjusted under 35 U.S.C. 154(b) by 0 days.

(21) Appl. No.: 16/751,557

(22) Filed: Jan. 24, 2020

Related U.S. Application Data

(63) Continuation-in-part of application No. 16/377,210, filed on Apr. 7, 2019.

(51) Int. Cl.
*A47J 31/40* (2006.01)
*A47J 31/41* (2006.01)
(Continued)

(52) U.S. Cl.
CPC .............. *A47J 31/407* (2013.01); *A23F 5/46* (2013.01); *A23L 2/52* (2013.01); *A23L 2/68* (2013.01);
(Continued)

(58) Field of Classification Search
CPC . C12G 3/055; C12G 3/06; C12G 3/04; C12G 3/08; C12G 3/085; B65C 3/08; B65C 9/46; B67C 3/023; B67C 2003/228; B67C 7/0073; B67C 3/007; B67C 3/0073; C02F 9/00; C02F 1/444; C02F 1/66; C02F 2101/12; C02F 1/004; C02F 2103/02; C02F 1/32; C02F 1/265; C02F 1/30; C02F 2103/08; C02F 2303/04; C02F 2101/14; C02F 2209/06; C02F 2209/02; C02F 2103/26; C02F 2103/10; C02F 2103/007; C02F 1/008; C02F 1/02; C02F 1/68; C02F 1/685; C02F 1/686; C02F 1/78; C02F 2101/2103; C02F 2101/007; C02F 2101/08; C02F 2101/10; C02F 2101/26; C02F 2209/36; A23L 3/003; A23L 2/72; A23L 3/005; A23L 2/38; A23L 2/42; A23L 2/48; A23L 2/50; A23L 2/52; A23L 2/68; A23L 2/78; A23F 5/26; A23F 5/262; A23F 5/267; A23F 5/46; A23F 5/465; A23F 2200/00; A47J 31/002; A47J 31/06; A47J 31/10; A47J 31/18; A47J 31/20; A47J 31/44;
(Continued)

(56) References Cited

U.S. PATENT DOCUMENTS 9,499,385 B1 * 11/2016 Studor .............. G06F 16/24575
9,808,114 B1 * 11/2017 Heys ...................... A47J 31/46
(Continued)

*Primary Examiner* — Joseph W Drodge
(74) *Attorney, Agent, or Firm* — Edmond A. Defrank

(57) ABSTRACT

The embodiments disclose a method, including creating at least one device for brewing hot beverages with at least one ingredient including fulvic acid concentrated syrup, humic acid concentrated syrup and combined fulvic and humic concentrated syrup, wherein the at least one device includes at least one computer processor, at least one database memory device, and at least one digital controller, making at least one fulvic acid concentrated syrup, humic acid concentrated syrup and combined fulvic and humic concentrated syrup condiment packet, coffee packet, infused water source, and marinated beverage ingredient, and using an automated coffee fulvic-humic mixing application for remotely controlling the at least one device.

10 Claims, 10 Drawing Sheets

(51) Int. Cl.
*A47J 31/52* (2006.01)
*A47J 31/46* (2006.01)
*A23L 2/52* (2006.01)
*A23L 2/68* (2006.01)
*A23F 5/46* (2006.01)

(52) U.S. Cl.
CPC .............. *A47J 31/402* (2013.01); *A47J 31/41* (2013.01); *A47J 31/465* (2013.01); *A47J 31/467* (2013.01); *A47J 31/468* (2018.08); *A47J 31/521* (2018.08); *A23F 2200/00* (2013.01)

(58) Field of Classification Search
CPC ...... A47J 31/4403; A47J 31/52; A47J 31/521; A47J 31/525; A47J 31/5251; A47J 31/5253; A47J 31/5255; A61K 33/00; A61K 31/185; A61K 31/19; C27C 12/00; C27C 12/002; A61L 2/0017; A61L 2/0023; A61L 2/0047; A61L 2/02; A61L 2/022; A61L 2/04; A61L 2/08; A61L 2/10; A61L 2/28; C12C 12/00; C12C 12/002
USPC ............ 422/2, 3, 14, 22, 24, 28, 29, 40, 41; 426/66, 74, 237, 248, 271, 490, 492, 493, 426/495, 521, 542, 590, 592, 594, 595, 426/599
See application file for complete search history.

(56) References Cited

U.S. PATENT DOCUMENTS

| | | | | |
|---|---|---|---|---|
| 10,421,670 | B1* | 9/2019 | Wilkie | C02F 1/004 |
| 2008/0017042 | A1* | 1/2008 | Almblad | A47J 31/007 |
| | | | | 99/280 |
| 2008/0193403 | A1* | 8/2008 | Witten | A61K 8/64 |
| | | | | 424/70.6 |
| 2009/0219140 | A1* | 9/2009 | Guard | A47J 31/407 |
| | | | | 340/10.1 |
| 2011/0070348 | A1* | 3/2011 | Burton-Wilcock | A47J 31/465 |
| | | | | 426/431 |
| 2011/0171319 | A1* | 7/2011 | Duoibes | A61K 8/44 |
| | | | | 424/602 |
| 2012/0156337 | A1* | 6/2012 | Studor | A23F 5/26 |
| | | | | 426/231 |
| 2013/0098249 | A1* | 4/2013 | Fidler | A47J 31/525 |
| | | | | 99/283 |
| 2013/0209627 | A1* | 8/2013 | MacPherson | A23F 3/163 |
| | | | | 426/234 |
| 2014/0272016 | A1* | 9/2014 | Nowak | A23L 2/52 |
| | | | | 426/112 |
| 2015/0201796 | A1* | 7/2015 | Kuempel | A47J 31/5255 |
| | | | | 426/231 |
| 2016/0066603 | A1* | 3/2016 | Adam | C07D 311/42 |
| | | | | 426/545 |
| 2017/0354290 | A1* | 12/2017 | Jones | A47J 31/40 |
| 2017/0360250 | A1* | 12/2017 | Spencer | A47J 31/04 |
| 2018/0000108 | A1* | 1/2018 | Boggavarapu | A47J 31/5253 |
| 2018/0168385 | A1* | 6/2018 | Boone | A47J 31/52 |

* cited by examiner

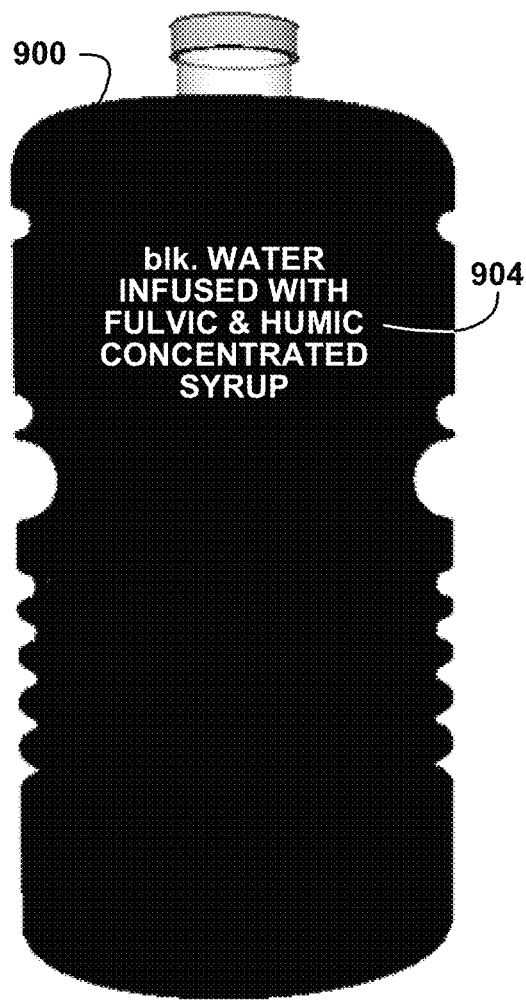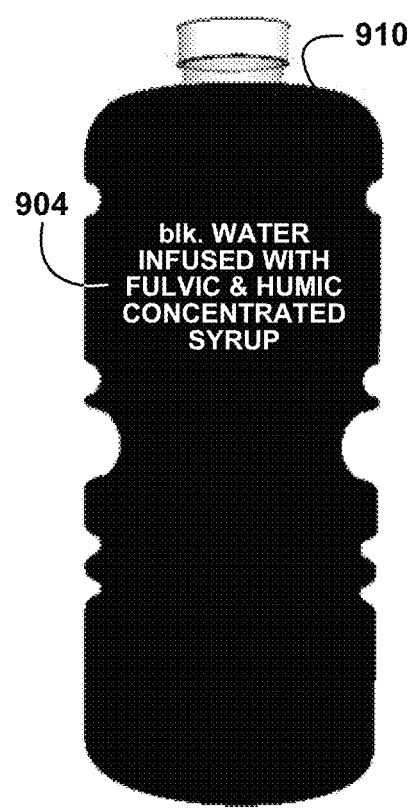
FIG. 9A
FIG. 9B

FULVIC ACID-HUMIC ACID COFFEE BREWER METHOD AND DEVICES

CROSS-REFERENCE TO RELATED APPLICATIONS

This Patent Application is a Continuation-in part and claims priority to United States Patent Application entitled: "HUMIC AND FULVIC BLACK WATER BASED BEVERAGE FOR HUMAN CONSUMPTION", U.S. Ser. No. 16/377,210 filed on Apr. 7, 2019, the U.S. Patent Application being incorporated herein by reference.

BACKGROUND

Coffee is one of the most popular beverages in the United States. However the nutritional value of coffee is lacking. Medical reports put the blame on overdrinking of coffee on hypertension, sleep problems and other conditions. What is needed is a way to increase the nutritional and health benefits to coffee drinkers to mitigate some of the negative impacts of coffee consumption. The same is true and can be said of other beverages that lack nutritional properties.

BRIEF DESCRIPTION OF THE DRAWINGS

FIG. 9A shows for illustrative purposes only an example of a 40 oz. fulvic-humic infused blk. water bottle of one embodiment.

FIG. 9B shows for illustrative purposes only an example of a 16.9 oz. fulvic-humic infused blk. water bottle of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of fulvic-humic coffee brewer method and devices is described for illustrative purposes and the underlying system can apply to any number and multiple types of beverages. In one embodiment of the present invention, the fulvic-humic coffee brewer method and devices can be configured using fulvic acid, humic acid and combined fulvic and humic acids. The fulvic-humic coffee brewer method and devices may be configured to include a counter-top fulvic acid-humic acid coffee brewer and may be configured to include commercial bar top fulvic acid-humic acid coffee brewers using the present invention.

The terms "fulvic acid" and "humic acid" used herein may also be simply referred to as "fulvic" and "humic" for brevity without any change in meaning.

Figure 1:
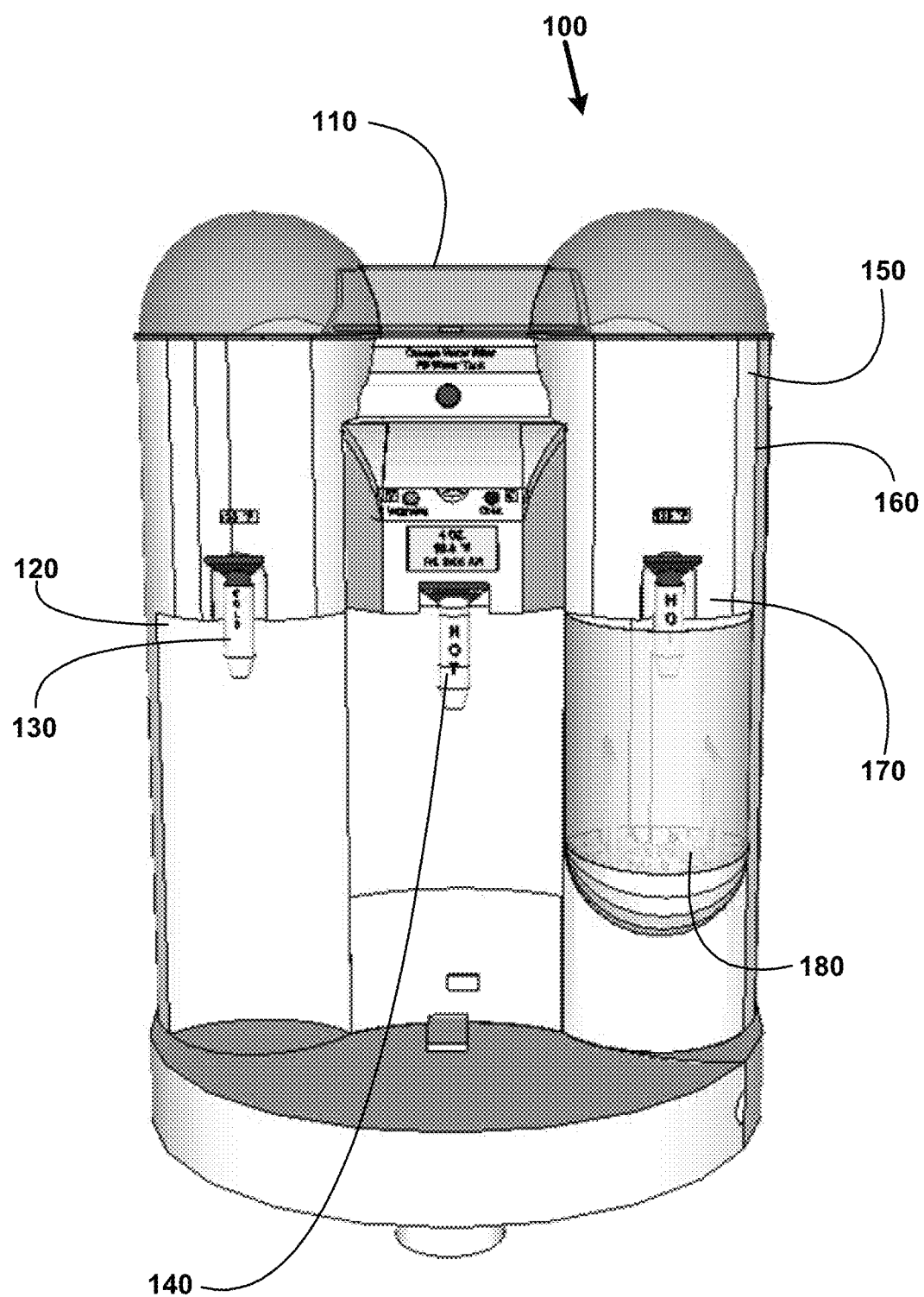
FIG. 1 shows for illustrative purposes only an example of a fulvic-humic coffee brewer of one embodiment.

FIG. 1 shows for illustrative purposes only an example of a fulvic-humic coffee brewer of one embodiment. FIG. 1 shows a fulvic acid-humic acid coffee brewer method and devices including a fulvic-humic coffee brewer 100. The fulvic-humic coffee brewer 100 shown is a counter-top fulvic acid-humic acid coffee brewer. The embodiments of the fulvic acid-humic acid coffee brewer are configured for brewing hot beverages with fulvic and humic acid ingredients.

This embodiment may be used in a home, an office or other location to brew for example coffee with the additional ingredients of fulvic and humic acids.

The fulvic-humic coffee brewer 100 includes a reservoir and storage lid 110, a cold water reservoir 120, cold water dispenser for beverage drinks 130 and a cup with fulvic syrup concentrate hot water dispenser 140, a computer processer 101, database memory device 102 and controllers 103. The cup with fulvic syrup concentrate hot water dispenser 140 includes features wherein the user can push a first button to dispense fulvic acid concentrated syrup and/or push a second button to dispense humic acid concentrated syrup into a cup with hot beverage or cold beverage ingredients. The user may then fill the cup with either hot or cold water.

The fulvic-humic coffee brewer 100 additionally includes a hot water flash heater 150, coffee flow-thru packet compartment 160, a hot coffee fill lever 170 and a cup shelf for filling 180. The coffee flow-thru packet compartment 160 is where a user can insert a fulvic-humic coffee packet to brew a cup of coffee that includes the fulvic and humic acids of one embodiment.

DETAILED DESCRIPTION

Figure 2A:
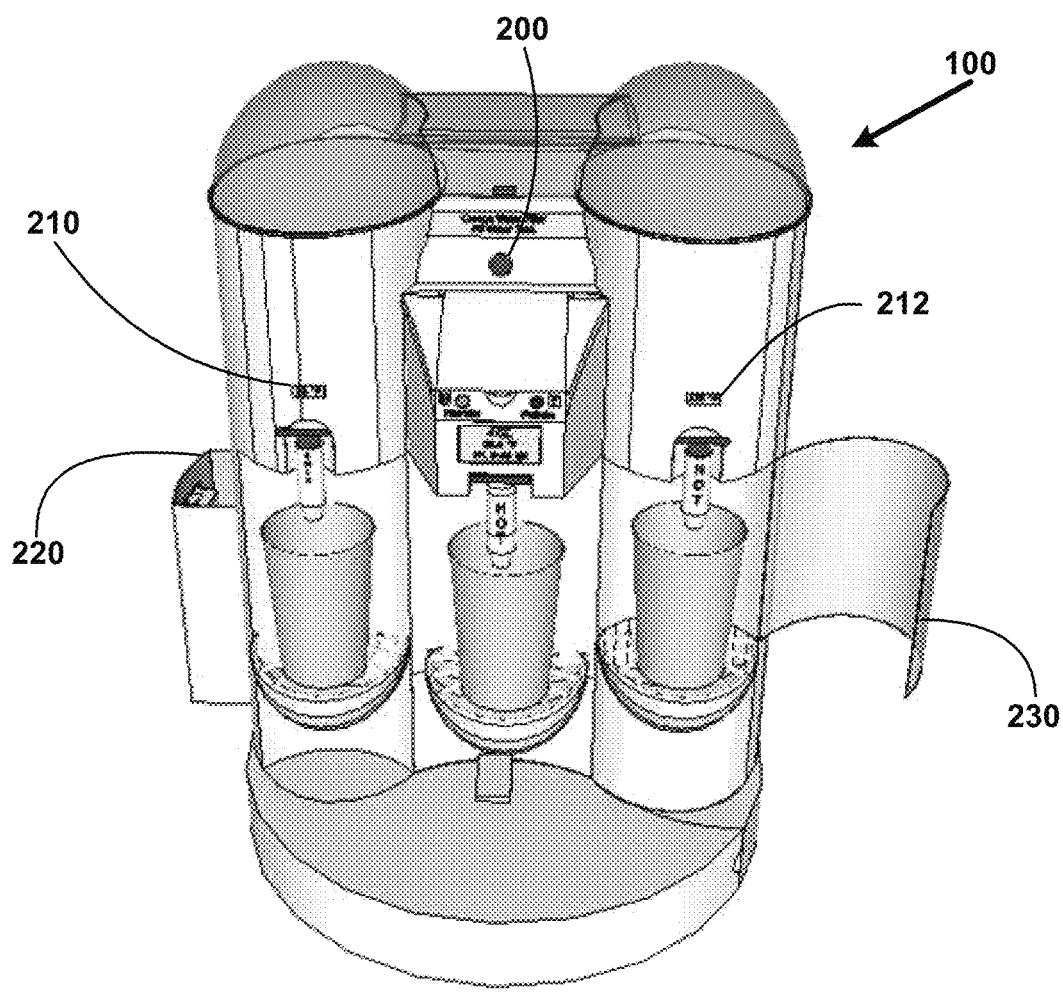
FIG. 2A shows for illustrative purposes only an example of a cold water reservoir fill opening of one embodiment.

FIG. 2A shows for illustrative purposes only an example of a cold water reservoir fill opening of one embodiment. FIG. 2A shows the fulvic-humic coffee brewer 100 further includes a cold water reservoir fill light 200 used to alert the user that the water reservoir is at a low level and needs to be refilled. The fulvic-humic coffee brewer 100 further includes a cold water temperature display 210, cold water reservoir fill opening 220, hot water temperature display 212, a computer processor 101, database memory device 102 and controllers 103 and showing is a cup shelf door opened 230 where a user places a coffee cup to be filled using a fulvic-humic coffee packet of one embodiment. In another embodiment the cold water reservoir 120 of FIG. 1 can be filled with blk. water that contains fulvic and humic acids and can be used to prepare a hot coffee beverage with a coffee packet that does not contain fulvic and humic acids. In another embodiment the cold water reservoir 120 of FIG. 1 can be filled with blk. water that contains fulvic and humic acids and can be used to prepare a cold beverage without having to add fulvic acid and/or humic acid concentrated syrups.

Figure 2B:
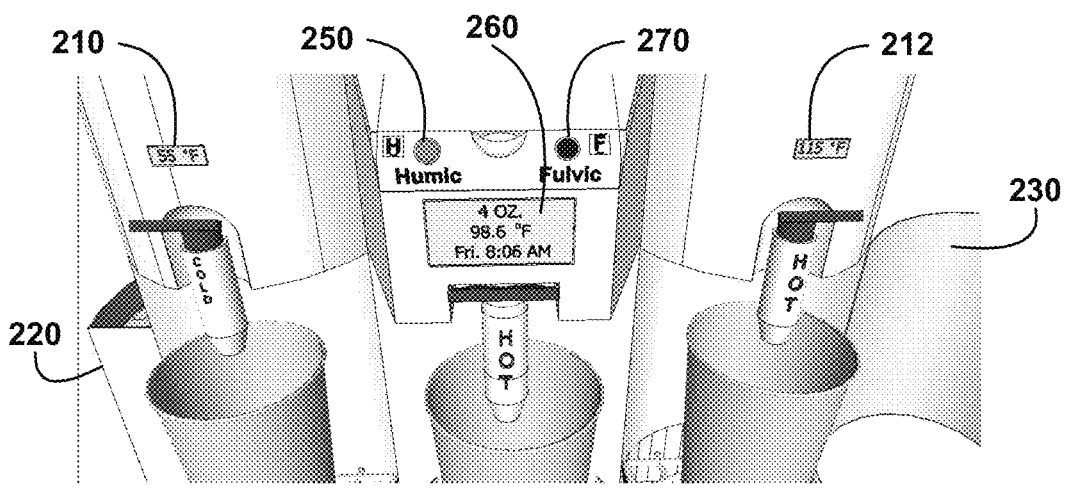
FIG. 2B shows for illustrative purposes only an example of a fulvic-humic dispenser of one embodiment.

Fulvic-Humic Dispenser:

FIG. 2B shows for illustrative purposes only an example of a fulvic-humic dispenser of one embodiment. FIG. 2B shows the cold water reservoir fill opening 220 and the cup shelf door opened 230. Also shown is a detailed close up view of the cold water temperature display 210 and hot water temperature display 212. Also showing is the first button to dispense fulvic acid concentrated syrup called a fulvic dispenser button 270 and the second button to dispense humic acid concentrated syrup called a humic dispenser button 250. Another feature showing is a timer control panel display 260 which displays a user inputted data for preparing a fulvic-humic cup of coffee to start for example at a specific time and of a specific volume and temperature of one embodiment.

Figure 3:
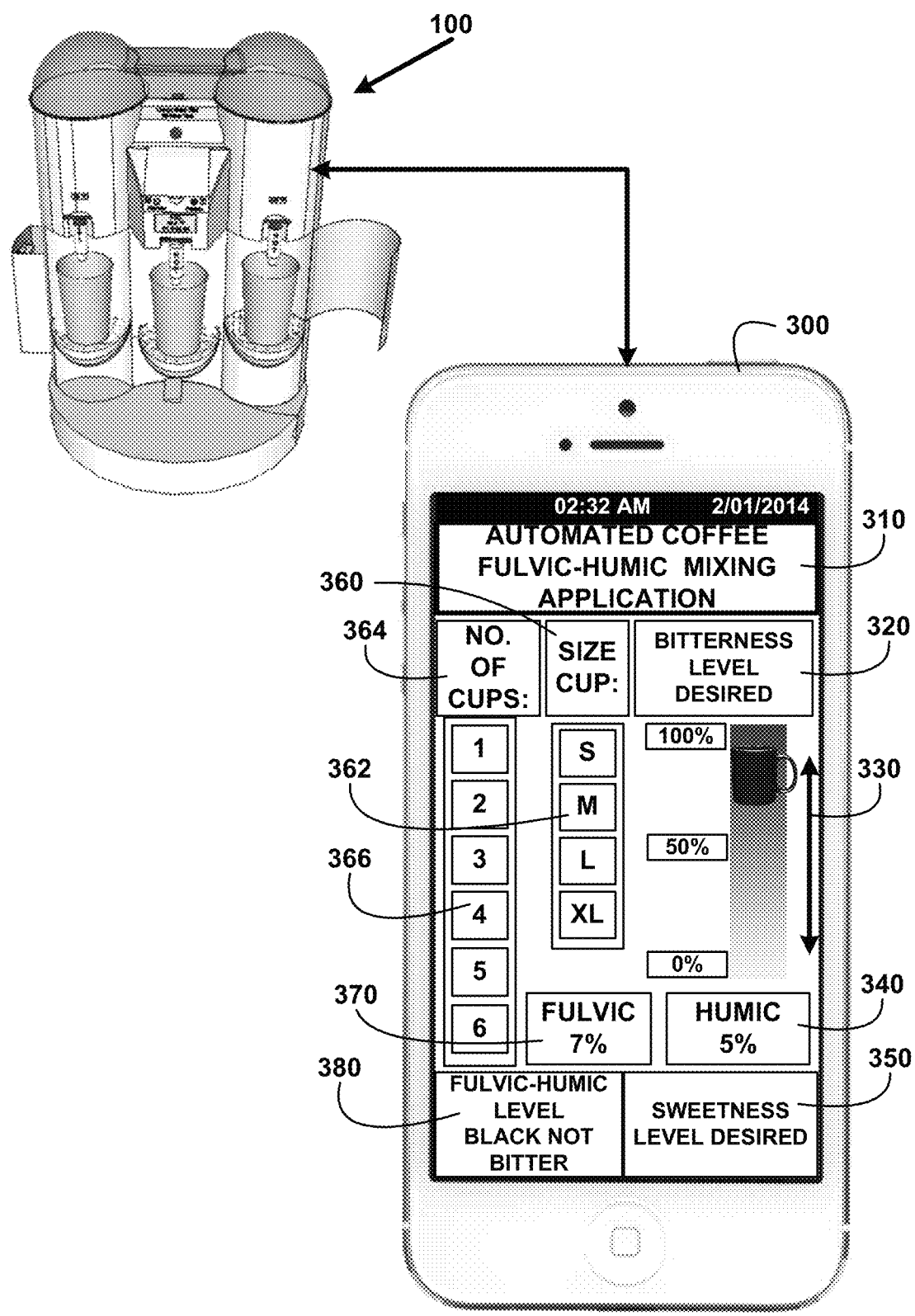
FIG. 3 shows for illustrative purposes only an example of an automated coffee fulvic-humic mixing application of one embodiment.

Automated Coffee Fulvic-Humic Mixing Application:

FIG. 3 shows for illustrative purposes only an example of an automated coffee fulvic-humic mixing application of one embodiment. FIG. 3 shows the fulvic-humic coffee brewer 100 with, a computer processor 101, database memory device 102 and controllers 103 being operated remotely using a user digital device 300 with an automated coffee fulvic-humic mixing application 310. The automated coffee fulvic-humic mixing application 310 provides the user with features to select functions for customizing the fulvic and humic mixture, sweetness/bitterness and how many cups to brew. The user may select for example a bitterness level desired 320 using a level slide actuator 330. The user may select for example the portions of humic 5% 340 and fulvic 7% 370 by tapping on the button and the level slide actuator 330 converts the % selection used for the mixture ingredient selected. For example the user taps the sweetness level desired 350 then uses the level slide actuator 330 to select how sweet the user wants the cup of coffee. The automated coffee fulvic-humic mixing application 310 has features for the user to select a size cup 360 for example M 362 for a medium sized cup. The user can then select a no. of cups 364 for example 4 366. Also showing is a message to the user that fulvic-humic level black not bitter 380 to inform the user that the fulvic and humic ingredients also make the coffee black without the bitterness of one embodiment.

Figure 4:
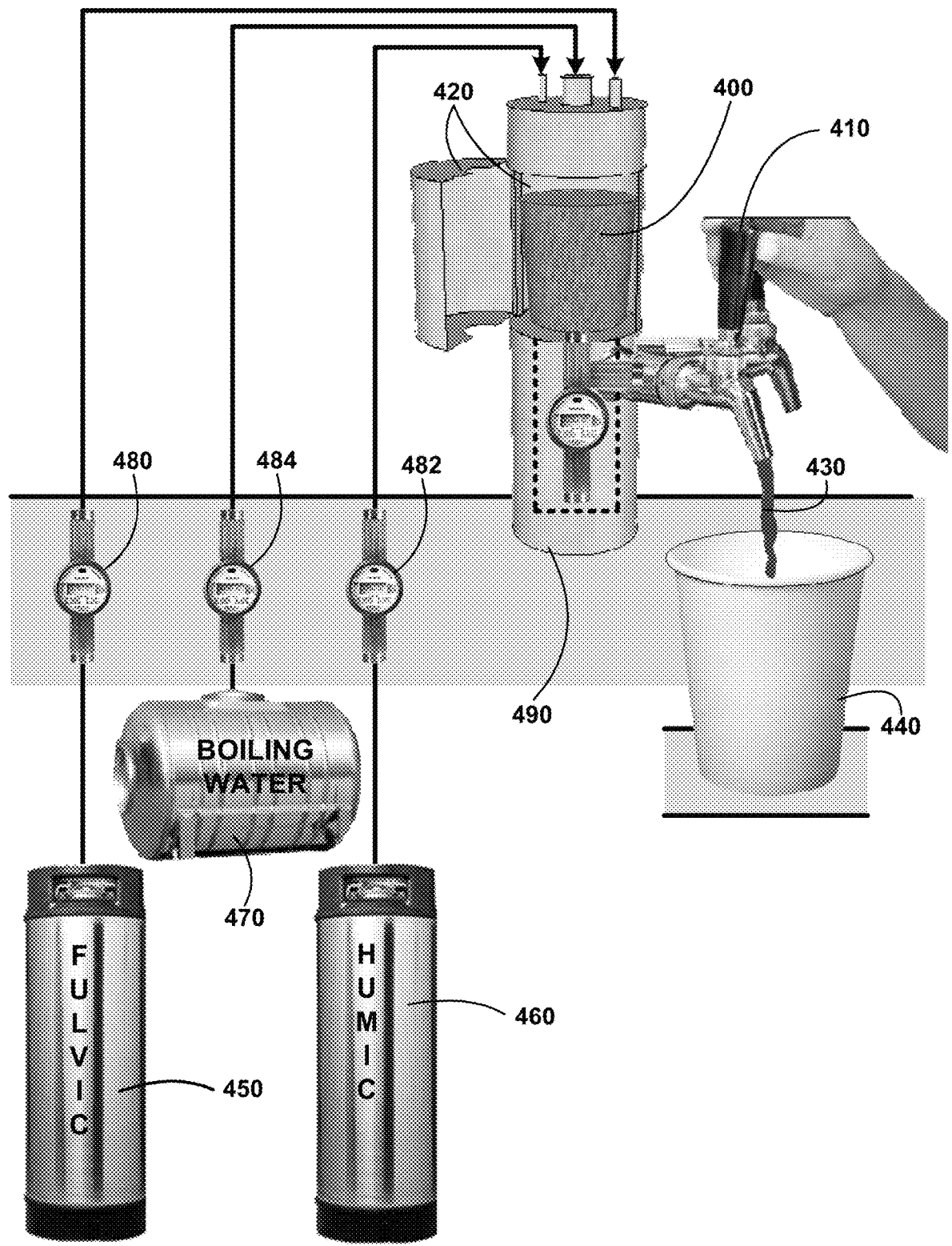
FIG. 4 shows for illustrative purposes only an example of a bar top fulvic-humic coffee dispenser of one embodiment.

Bar Top Fulvic-Humic Coffee Dispenser:

FIG. 4 shows for illustrative purposes only an example of a bar top fulvic-humic coffee dispenser of one embodiment. FIG. 4 shows a bar top fulvic-humic coffee dispenser 490 with a computer processor 101, database memory device 102 and controllers 103. The bar top fulvic-humic coffee dispenser 490 includes a fulvic syrup concentrate canister below bar top 450. The fulvic syrup concentrate canister below bar top 450 on demand pumps fulvic syrup concentrate to the bar top fulvic-humic coffee dispenser 490 via a fulvic digital valve 480 to dispense a selected portion of the fulvic syrup concentrate for a cup of coffee. The bar top fulvic-humic coffee dispenser 490 includes a humic syrup concentrate canister below bar top 460 on demand pumps humic syrup concentrate to the bar top fulvic-humic coffee dispenser 490 via a humic digital valve 482 to dispense a selected portion of the humic syrup concentrate for a cup of coffee. The bar top fulvic-humic coffee dispenser 490 includes a boiling water flash heater below bar top 470 on demand pumps boiling water via a boiling water digital valve 484 to dispense a selected portion of the boiling water for brewing a cup of coffee.

The bar top fulvic-humic coffee dispenser 490 includes a coffee packet insert chamber 420 and used for placing a coffee packet 400 for brewing a cup of coffee. The bar top fulvic-humic coffee dispenser 490 includes (not shown) a computer processor 101 and database memory device 102. The computer processor 101 and database memory device 102 may be used to store data of various coffee blends, sweeteners natural and artificial, fulvic and humic acid properties, and controllers 103 for use with the digital valves described above for controlling the opening and closing of the valves according to the portions selected by the operator.

The computer processor 101 and database memory device 102 also include controllers 103 for the operation of the boiling water flash heater below bar top 470 for regulating the temperature and pumping pressures for the fulvic syrup concentrate canister below bar top 450, humic syrup concentrate canister below bar top 460 and boiling water flash heater below bar top 470. The computer processor 101 and database memory device 102 also regulate the order of the ingredients being pumped into the coffee packet 400 for example first the fulvic, second the humic and lastly the boiling water. This will allow the pressured flow of the boiling water to churn the mixture for a full blending of the ingredients. The churning and brewing of the fulvic-humic continues until an operator opens the brewed coffee tap 410 allowing mixed brewed coffee pouring into a cup 430 in preparation for serving the coffee cup 440 to a customer of for example a restaurant or coffee house.

Fulvic acid vitamins and minerals: Fulvic acid has a molecular structure of the vitamins and minerals C37H33N1S1O33 molecule. Fulvic acid is well known for its health benefits due to the unique properties and abundance of the essential vitamins and minerals required by the human body for cellular level functions. It is abundantly clear that the fulvic acid molecule is replete with carbon molecules. Fulvic acid also includes amounts of the nutrition a person needs on a daily basis including many vitamins and minerals including the trace minerals of one embodiment.

During decomposition, organic matter releases millions of beneficial microbes and chemically active compounds containing a variety of beneficial nutrients. Fulvic acid is among the potent compounds released in the decomposition process. Among other nutritional benefits, fulvic acid contains an assortment of fatty acids, hormones, vitamins, minerals, ketones, and flavonoids, nutrients needed for healthy cell and body development. The alcohol-soluble portion of the humic fraction is, in general, named ulmic acid. So-called "gray humic acids" (GHA) are soluble in low-ionic-strength alkaline media; "brown humic acids" (BHA) are soluble in alkaline conditions independent of ionic strength; and fulvic acids (FA) are soluble independent of pH and ionic strength.

Trace minerals are also referred to as trace elements or essential minerals and they can be a serious concern to your health if they're lacking. Trace minerals work synergistically with other minerals, vitamins, enzymes, and amino acids in a wide variety of biochemical reactions. When you're deficient in one or more minerals, your body can start to show symptoms. For instance, those deficient in Magnesium, may have constipation, anxiety, depression and sleep problems. Zinc is vital for immune function so zinc deficiency can increase the chance of illness or skin problems. Selenium is important for normal heart function and for fertility, especially in men. In fact, research has shown a link between severe selenium deficiency and Sudden Death Syndrome (a name for the unexplained cardiac related deaths of people under age 35 with no apparent heart disease). Even minerals just needed in tiny amounts, like copper, are vital, as a deficiency of copper can lead to irregular heartbeat or even more severe heart problems. Essentially, the body starts to break down in a state of mineral deficiency, as it simply does not have the necessary elements to function correctly.

Minerals derived in their natural, ionic state are known as organic minerals. This kind of mineral actually chelates or naturally removes inorganic minerals from the body, which is good thing, because you don't want minerals staying in your system for too long, or they can become toxic (hence the need for daily replenishment). Organic minerals occur naturally in plants, which are supposed to extract 70-80 minerals from the soil and pass them on to the plants we eat, or the plants that animals eat (and those minerals should then pass from plant to animal to us). Also, ionic minerals cannot be stored in the body for longer than a few hours, they are much like the water soluble vitamins; therefore, they cannot build up to toxic levels in the soft tissues.

Fulvic acid contributes to improved digestive health, better nutrient absorption, fulvic acid combats vitamin and mineral deficiencies. Fulvic acid includes these nutrients 17 vitamins, 59 minerals, 12 amino acids and three essential fatty acids essential for proper cell and body development. It improves absorption of nutrients from the digestive tract into the bloodstream. Improved digestion includes gastrointestinal disorders, diarrhea, constipation, bloating, and flatulence. Fulvic acid also aids with increased energy flow, and boosts immune response. Fulvic acid is also known to be alkaline, this restores the body's optimal pH levels to improve the body's defenses against disease-causing microbes and toxins as well. Fulvic acid contributes to healthy skin, hair, and nails. Fulvic acid is a rich source of potent antioxidant, nutraceuticals, contains potent anti-inflammatory properties, aids in removal of toxins, promotes brain health and encourages muscle repair of one embodiment.

Humic acids are insoluble in water at acid pH, whereas fulvic acids are also derived from humic substances but are soluble in water across the full range of pH. Fulvic acids are poly-electrolytes and are unique colloids that diffuse easily through membranes whereas all other colloids do not. Fulvic acids are soluble in water across the full range of pH. Fulvic acid includes these nutrients 17 vitamins, 59 minerals, 12 amino acids and three essential fatty acids of one embodiment.

Figure 5:
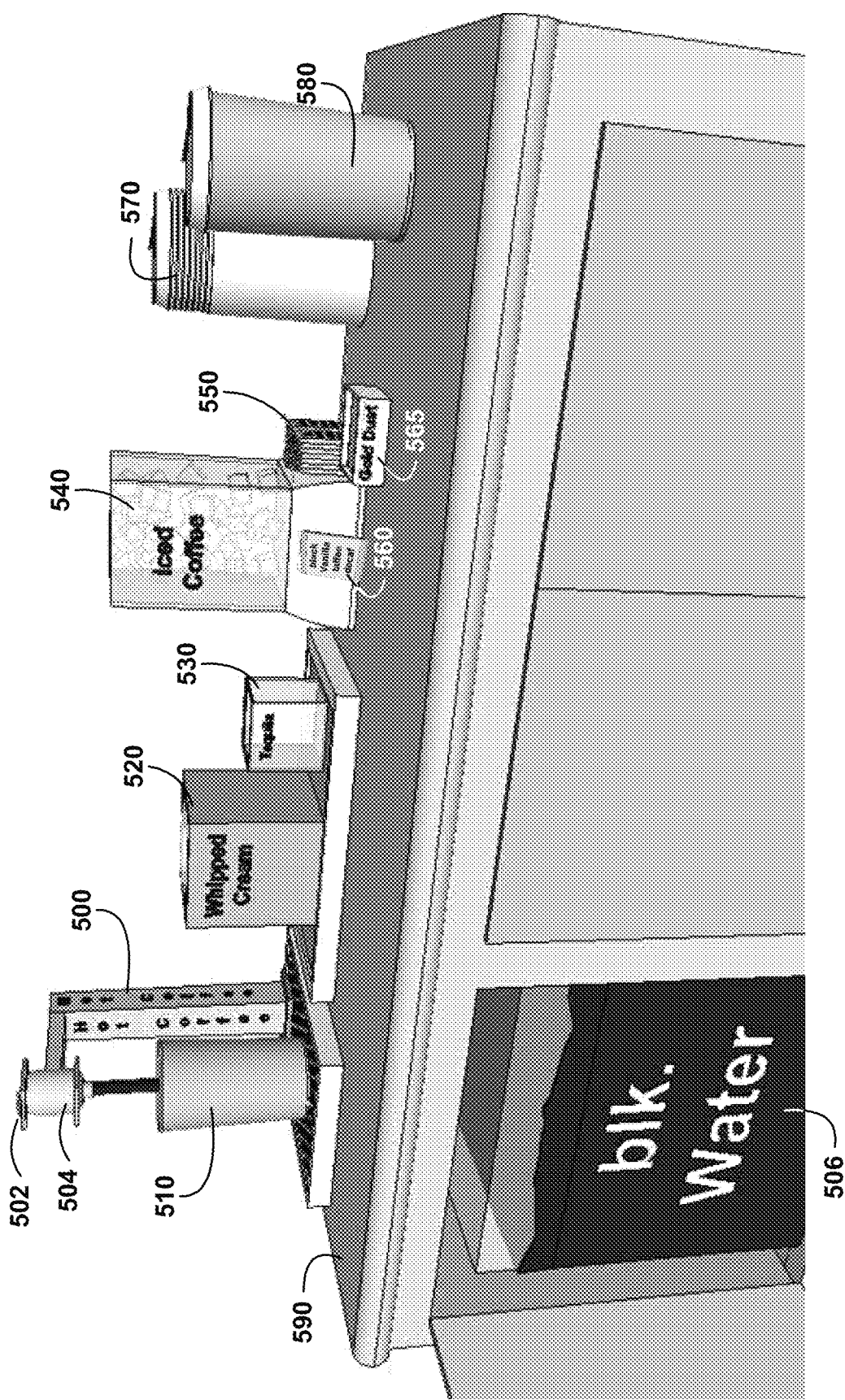
FIG. 5 shows for illustrative purposes only an example of a blk. coffee instant hot dispenser and toppings service bar line of one embodiment.

Blk. Coffee Instant Hot Dispenser:

FIG. 5 shows for illustrative purposes only an example of a blk. coffee instant hot dispenser and toppings service bar line of one embodiment. FIG. 5 shows a blk. coffee instant hot dispenser 500 with a computer processer 101, database memory device 102 and controllers 103 and including a coffee pouch content chamber lid 502 that is opened for emptying a coffee pouch into the coffee and hot blk. water mixing chamber 504. The blk. water contains fulvic and humic acid. A blk. water supply container 506 pumps on demand a predetermined volume into the instant hot water heating device in the blk. coffee instant hot dispenser 500.

The computer processer 101 and database memory device 102 also include controllers 103 for determining the predetermined volume of instant hot water to be dispensed based on the size of the cup selected and controlling the pump valves to open and close to permit the predetermined volume of blk. water to flow to the instant hot water heating device. The computer processer 101 and database memory device 102 also include controllers 103 for regulating the temperature controls of the instant hot water heating device.

The computer processer 101 and database memory device 102 also include controllers 103 for regulating the mixing and churning time in the coffee and hot blk. water mixing chamber 504 before activating the dispensing button functions and activating a ready light to illuminate the dispense button indicating a hot blk. water and coffee pouch mixture is ready to be dispensed. The automated coffee fulvic-humic mixing application may be used on a user digital device for setting predetermined volumes, temperatures and mixing and churning times in the controllers 103 via the computer processor 101 and database memory device 102.

The blk. water supply container 506 is placed under the counter top of a blk. coffee serving bar line counter with cabinets 590. The blk. water predetermined pumped volume is heated to a predetermined temperature and pumped into the hot blk. water mixing chamber 504. The pressurized flow of heated blk. water mixes and churns with the deposited coffee pouch contents in preparation for dispensing. After a predetermined time of mixing the hot blk. water and coffee pouch mixture may be poured into a coffee cup by a user pressing a dispense button. FIG. 5 shows a large coffee cup being filled from the instant hot dispenser 510. One example of a blk. water coffee recipe includes 1 Geisha Gold Vanilla Coffee pouch, 1½ oz. Sucio Tequila, 8 oz. hot blk. water, a shot of whipped cream on the coffee and a gold dust confection sprinkled on top of the whipped cream. The blk. coffee serving bar line counter with cabinets 590 is used for positioning the blk. coffee instant hot dispenser 500 above the blk. water supply container 506 and arranging the other serving materials for an efficient operation. The other serving materials include a whipped cream serving container 520, tequila serving container 530, iced coffee ice cube serving container 540, a variety of coffee pouches on display 550, gold dust serving container for dusting whipped cream 565 and a large coffee cup lid dispenser 570. Also showing is a large prepared coffee cup with lid attached 580 and a black Vanilla taffee decaf pouch 560 of one embodiment.

Figure 6A:
FIG. 6A shows for illustrative purposes only an example of a fulvic concentrated syrup of one embodiment.

Fulvic Concentrated Syrup:

FIG. 6A shows for illustrative purposes only an example of a fulvic concentrated syrup of one embodiment. FIG. 6A shows fulvic concentrated syrup 600 in a condiment packet.

A user wanting to add the fulvic concentrated syrup 600 to a beverage may tear open the condiment packet to put the fulvic concentrated syrup 600 into the beverage of one embodiment.

Figure 6B:
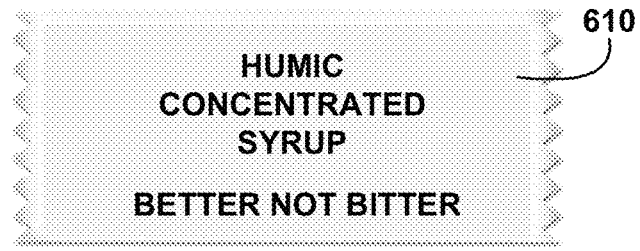
FIG. 6B shows for illustrative purposes only an example of a humic concentrated syrup of one embodiment.

Humic Concentrated Syrup:

FIG. 6B shows for illustrative purposes only an example of a humic concentrated syrup of one embodiment. FIG. 6B shows humic concentrated syrup 610 in a condiment packet. A user wanting to add the humic concentrated syrup 610 to a beverage may tear open the condiment packet to put the humic concentrated syrup 610 into the beverage of one embodiment.

Figure 6C:
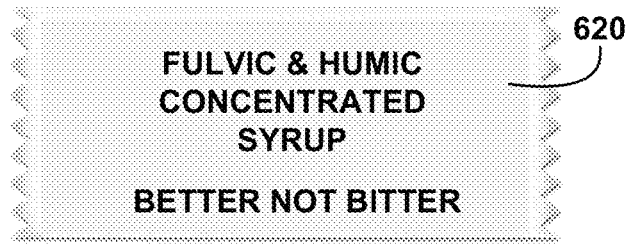
FIG. 6C shows for illustrative purposes only an example of a fulvic & humic concentrated syrup of one embodiment.

Fulvic & Humic Concentrated Syrup:

FIG. 6C shows for illustrative purposes only an example of a fulvic & humic concentrated syrup of one embodiment. FIG. 6C shows fulvic & humic concentrated syrup 620 in a condiment packet. A user wanting to add the combined fulvic & humic concentrated syrup 620 to a beverage may tear open the condiment packet to put the fulvic & humic concentrated syrup 620 into the beverage of one embodiment.

FIGS. 7A, 7B, 7C and 7D show fulvic & humic concentrated syrup marinated into various coffee blends. It should be understood that these are examples and the mixture of fulvic & humic concentrated syrup includes all coffee blends and additionally all tea blends and other beverage types and flavors both hot and cold. Marinating coffee grounds and/or freeze dried coffee crystals with liquid fulvic and/or humic concentrated syrup then drying the marinated grounds or crystals allow for dry storage in the packets. In addition the absorption of the fulvic, humic or their combination into the grounds or crystals is freely released when mixed with hot or boiling water of one embodiment.

Figure 7A:
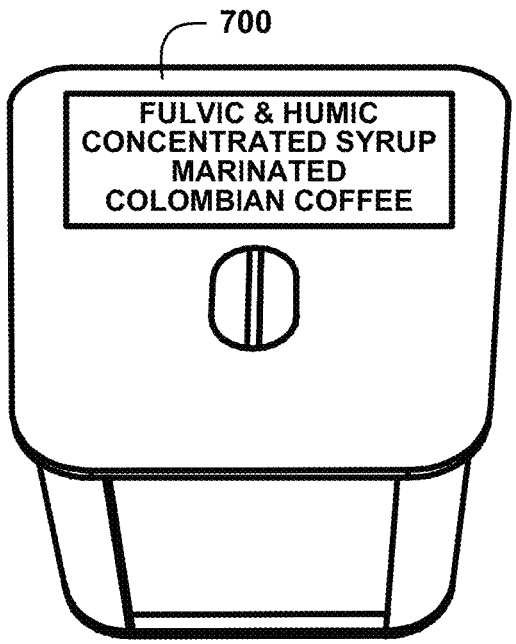
FIG. 7A shows for illustrative purposes only an example of a fulvic & humic concentrated syrup marinated Colombian coffee packet of one embodiment.

Fulvic & Humic Concentrated Syrup Marinated Colombian Coffee Packet:

FIG. 7A shows for illustrative purposes only an example of a fulvic & humic concentrated syrup marinated Colombian coffee packet of one embodiment. FIG. 7A shows a fulvic & humic concentrated syrup marinated Colombian coffee packet 700 for use in the counter-top fulvic acid-humic acid coffee brewer and bar top fulvic-humic coffee dispenser of one embodiment.

Figure 7B:
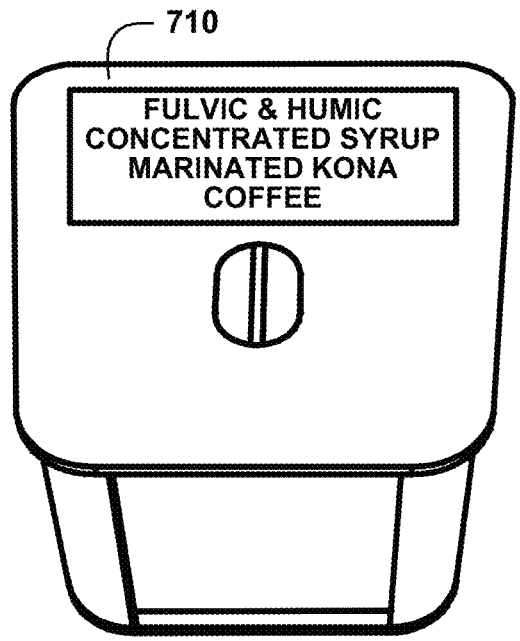
FIG. 7B shows for illustrative purposes only an example of a fulvic & humic concentrated syrup marinated Kona coffee packet of one embodiment.

Fulvic & Humic Concentrated Syrup Marinated Kona Coffee Packet:

FIG. 7B shows for illustrative purposes only an example of a fulvic & humic concentrated syrup marinated Kona coffee packet of one embodiment. FIG. 7B shows a fulvic & humic concentrated syrup marinated Kona coffee packet 710 for use in the counter-top fulvic acid-humic acid coffee brewer and bar top fulvic-humic coffee dispenser of one embodiment.

Figure 7C:
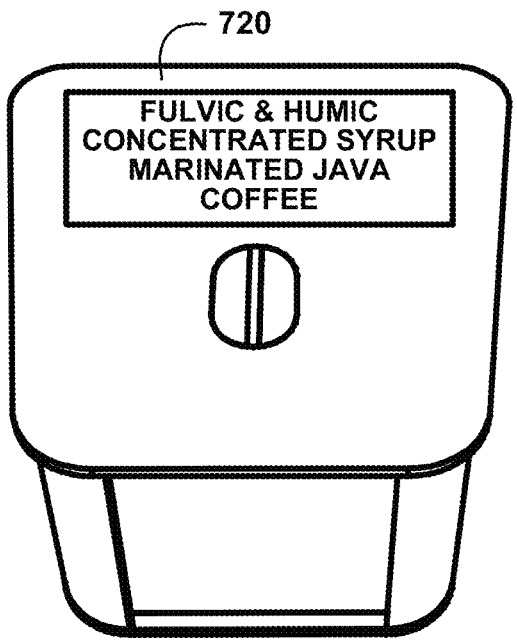
FIG. 7C shows for illustrative purposes only an example of a fulvic & humic concentrated syrup marinated Java coffee packet of one embodiment.

Fulvic & Humic Concentrated Syrup Marinated Java Coffee Packet:

FIG. 7C shows for illustrative purposes only an example of a fulvic & humic concentrated syrup marinated Java coffee packet of one embodiment. FIG. 7C shows a fulvic & humic concentrated syrup marinated Java coffee packet 720 for use in the counter-top fulvic acid-humic acid coffee brewer and bar top fulvic-humic coffee dispenser of one embodiment.

Figure 7D:
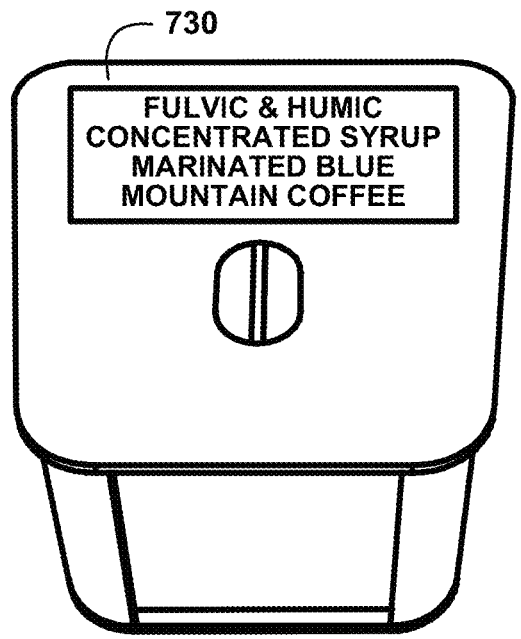
FIG. 7D shows for illustrative purposes only an example of a fulvic & humic concentrated syrup marinated Blue Mountain coffee packet of one embodiment.

Fulvic & Humic Concentrated Syrup Marinated Blue Mountain Coffee Packet:

FIG. 7D shows for illustrative purposes only an example of a fulvic & humic concentrated syrup marinated Blue Mountain coffee packet of one embodiment. FIG. 7D shows a fulvic & humic concentrated syrup marinated Blue Mountain coffee packet 730 for use in the counter-top fulvic acid-humic acid coffee brewer and bar top fulvic-humic coffee dispenser of one embodiment.

Figure 8A:
FIG. 8A shows for illustrative purposes only an example of a blk. Geisha Gold Coffee pouch of one embodiment.

Blk. Geisha Gold Coffee Pouch:

FIG. 8A shows for illustrative purposes only an example of a blk. Geisha Gold Coffee pouch of one embodiment. FIG. 8A shows a blk. Geisha Gold Coffee pouch 800 whose contents are emptied into the coffee and hot blk. water mixing chamber 504 of FIG. 5 of the instant hot dispenser 500 of FIG. 5 of one embodiment.

Figure 8B:
FIG. 8B shows for illustrative purposes only an example of a Geisha Gold Coffee Vanilla pouch of one embodiment.

Geisha Gold Coffee Vanilla Pouch:

FIG. 8B shows for illustrative purposes only an example of a Geisha Gold Coffee Vanilla pouch of one embodiment. FIG. 8B shows a Geisha Gold Coffee Vanilla pouch 810 whose contents are emptied into the coffee and hot blk. water mixing chamber 504 of FIG. 5 of the instant hot dispenser 500 of FIG. 5 of one embodiment.

Figure 8C:
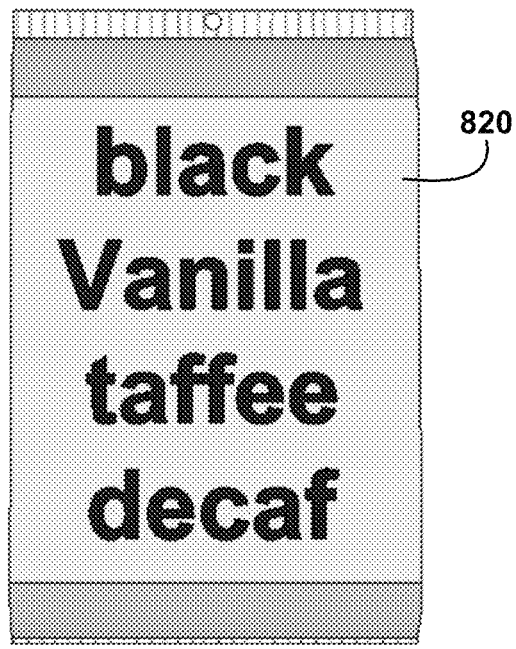
FIG. 8C shows for illustrative purposes only an example of a black Vanilla taffee decaf pouch of one embodiment.

Black Vanilla Taffee Decaf Pouch:

FIG. 8C shows for illustrative purposes only an example of a black Vanilla taffee decaf pouch of one embodiment. FIG. 8C shows a black Vanilla taffee decaf pouch 820 whose contents are emptied into the coffee and hot blk. water mixing chamber 504 of FIG. 5 of the instant hot dispenser 500 of FIG. 5 of one embodiment.

40 Oz. Fulvic-Humic Infused Water Bottle:

FIG. 9A shows for illustrative purposes only an example of a 40 oz. fulvic-humic infused blk. water bottle of one embodiment. FIG. 9A shows a 40 oz. fulvic-humic infused blk. water bottle 900 is filled with water infused with fulvic & humic concentrated syrup 904. The 40 oz. fulvic-humic infused blk. water bottle 900 is used for filling a coffee brewer, a teapot, and any container used for mixing a beverage hot or cold of one embodiment.

16.9 Oz. Fulvic-Humic Infused Blk. Water Bottle:

FIG. 9B shows for illustrative purposes only an example of a 16.9 oz. fulvic-humic infused blk. water bottle of one embodiment. FIG. 9B shows a 16.9 oz. fulvic-humic infused blk. water bottle 910 filled with water infused with fulvic & humic concentrated syrup 904. The 16.9 oz. fulvic-humic infused blk. water bottle 910 is used for preparing a single serving of a hot or cold beverage in a coffee brewer, a teapot, and any container used for mixing a beverage of one embodiment.

Figure 10A:
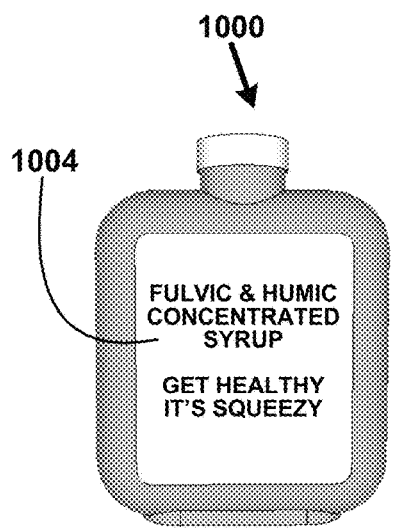
FIG. 10A shows for illustrative purposes only an example of a fulvic-humic squeeze bottle of one embodiment.

Fulvic-Humic Squeeze Bottle:

FIG. 10A shows for illustrative purposes only an example of a fulvic-humic squeeze bottle of one embodiment. FIG. 10A shows a squeeze bottle 1000 filled with fulvic & humic concentrated syrup 804. A squeeze bottle may also be filled with fulvic concentrated syrup or humic concentrated syrup of one embodiment.

Figure 10B:
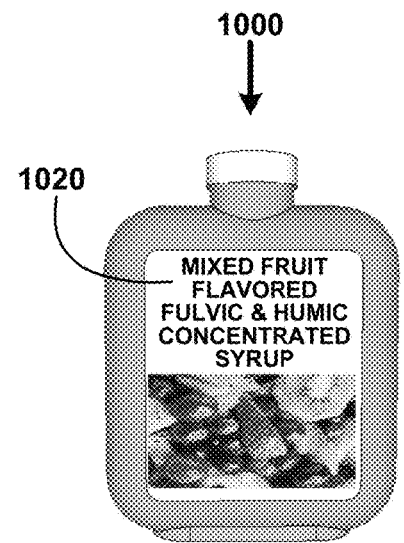
FIG. 10B shows for illustrative purposes only an example of a flavored fulvic-humic squeeze bottle of one embodiment.

Flavored Fulvic-Humic Squeeze Bottle:

FIG. 10B shows for illustrative purposes only an example of a flavored fulvic-humic squeeze bottle of one embodiment. FIG. 10B shows the squeeze bottle 1000 filled with a flavored fulvic & humic concentrated syrup 1020. A squeeze bottle may also be filled with a flavored fulvic concentrated syrup or a flavored humic concentrated syrup of one embodiment.

Figure 10C:
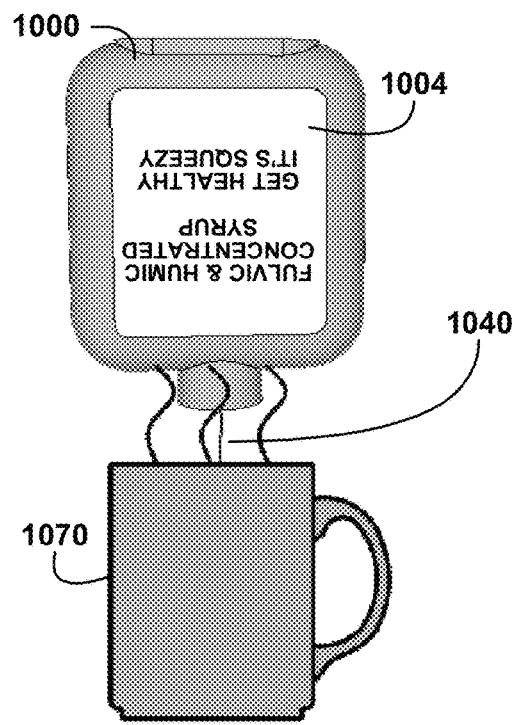
FIG. 10C shows for illustrative purposes only an example of fulvic-humic concentrate squirts into hot beverage of one embodiment.

Fulvic-Humic Concentrate Squirts into Hot Beverage:

FIG. 10C shows for illustrative purposes only an example of fulvic-humic concentrate squirts into hot beverage of one embodiment. FIG. 10C shows the squeeze bottle 1000 being used to put the fulvic & humic concentrated syrup 804 into the coffee cup 1070. The coffee cup 1070 may include a hot beverage for example coffee. A user pinches the sides of the squeeze bottle 1000 to produce squirts of fulvic & humic concentrated syrup into a hot beverage 1040 of one embodiment.

Figure 10D:
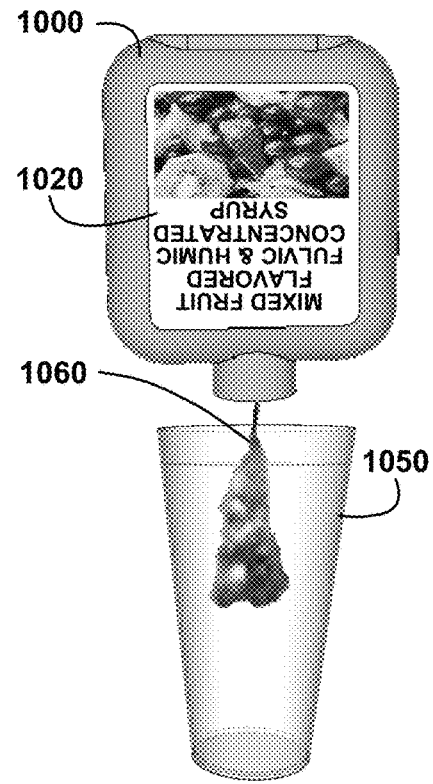
FIG. 10D shows for illustrative purposes only an example of flavored fulvic-humic concentrate squirts into cold beverage of one embodiment.

Flavored Fulvic-Humic Concentrate Squirts into Cold Beverage:

FIG. 10D shows for illustrative purposes only an example of flavored fulvic-humic concentrate squirts into cold beverage of one embodiment. FIG. 10D shows the squeeze bottle 1000 being used to squirt the flavored fulvic & humic concentrated syrup 1020 into a filled beverage glass 1050. The beverage glass 1050 may be filled for example with water and a user pinches the sides of the squeeze bottle 1000 to produce squirts of flavored fulvic & humic concentrated syrup into a cold beverage 1060 to add flavor and fulvic and humic acids to the beverage of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   brewing coffee in at least one coffee brewing device with a coffee blend ingredient mixture:
   adding a water source infused with a concentrated fulvic acid ingredient portion and a concentrated humic acid ingredient portion to form the coffee blend ingredient mixture;
   using at least one computer processor comprising at least one controller, and at least one database memory device, for storing data of various coffee blends and fulvic acid and humic acid properties: and
   using the at least one controller, the at least one controller being coupled to the coffee brewing device, for opening and closing of valves for dispensing the concentrated fulvic acid ingredient portion and the concentrated humic acid ingredient portion of the infused coffee blend ingredient mixture in predetermined selected percentages.

2. The method of claim 1, further comprising utilizing the at least one coffee brewing device for brewing hot fulvic acid-humic acid coffee beverages, the brewing device including a user digital device for setting volumes, temperature and mixing times in the at least one controller.

3. The method of claim 1, further comprising the at least one coffee brewing device including at least one coffee instant hot dispenser with computer regulated devices including an instant hot water heating device, at least one pump, at least one fulvic acid digital valve, at least one humic acid digital valve and a user digital device for setting mixing and churning times.

4. The method of claim 1, further comprising filling a coffee packet containing the coffee blend ingredient mixture.

5. The method of claim 1, further comprising filling at least one marinated coffee beverage ingredient packet with a dried fulvic acid and humic acid concentrated syrup marinated coffee blend.

6. The method of claim 1, wherein the at least one coffee brewing device is configured for a bar top installation and includes a fulvic acid syrup concentrate canister coupled to a fulvic acid digital valve, a humic acid syrup concentrate canister coupled to a humic acid digital valve, a boiling water flash heater coupled to a boiling water digital valve, a coffee packet insert chamber, and a brewed coffee tap.

7. The method of claim 1, wherein the at least one coffee brewing device is configured for use on a counter-top and includes a fulvic-humic coffee brewer, cold water reservoir, cold water dispenser for cold beverage drinks, a hot water flash heater, a flow-thru coffee flow-thru packet compartment, and a hot coffee fill lever.

8. The method of claim 1, wherein the valves comprise digital valves and the at least one controller is configured for use with the one or more digital valves for controlling opening and closing of the one or more digital valves.

9. The method of claim 1, wherein the at least one controller is configured for regulating temperatures of a boiling water flash heater and for regulating pumping pressures of boiling water through at least one digital valve and the at least one device is configured for a bar top installation.

10. The method of claim 1, wherein the at least one controller is configured for regulating pumping pressures of the concentrated fulvic acid portion as a concentrated syrup in a canister and regulating pumping pressures of humic acid concentrated syrup in another canister through separate digital valves coupled respectively to each canister.

* * * * *